Nov. 8, 1966  W. B. RANDOLPH  3,283,696
COOKING UTENSIL
Filed Feb. 3, 1964

INVENTOR
WILLIAM B. RANDOLPH

BY Donald G. Eaton

AGENT

United States Patent Office 3,283,696
Patented Nov. 8, 1966

3,283,696
COOKING UTENSIL
William B. Randolph, R.F.D. 1, Box 350c, Oakton, Va.
Filed Feb. 3, 1964, Ser. No. 341,975
9 Claims. (Cl. 99—425)

This invention relates to the preparation of food products and more particularly to a cooking utensil in the form of a frying pan for frying or broiling such food products.

In the frying of food products, such as bacon, sausage and the like, it is customary to place the same in a suitable pan heated to the desired temperature and allow the food products to cook while frequently turning the same to prevent burning or uneven cooking. Food products, such as those mentioned above, have a relatively high fat content and during the frying thereof this fat is liberated in the form of grease which collects in the pan and where a sufficiently high temperature to provide adequate cooking within a reasonable time is utilized, this grease tends to become overheated and, therefore, emits smoke and vapors which are unpleasant and which also tend to collect on walls, furniture and appliances necessitating frequent and relatively difficult cleaning thereof. While the emission of smoke and vapors may be considerably reduced by lowering the cooking temperature, this results in requiring a greater time for the cooking and also with certain food products, results in an interior cooking operation.

It is accordingly an object of the present invention to provide a cooking utensil for frying food products with which an optimum cooking temperature may be utilized without the danger of emitting smoke and vapors from grease collecting in the utensil.

A further object of the invention is the provision of a cooking utensil for frying food products in which means is provided for maintaining grease collected in the utensil at a relatively low temperature thereby preventing the emission of undesirable smoke and vapors.

A still further object of the invention is the provision of a cooking utensil for frying food products, such utensil including a drip trough of sufficient capacity to accommodate grease or other drippings from food being prepared in the utensil and in which means is provided for partially insulating the drip trough to prevent overheating thereof with a consequent emission of undesirable smoke and vapors.

Another object of the invention is the provision of a cooking utensil for frying food products including an easily removable handle which may be replaced upon breakage or damage thereto.

A further object of the invention is the provision of a cooking utensil for frying food products while preventing the emission of undesirable smoke and vapors, which utensil may be conveniently and economically manufactured from readily available lightweight materials and which may be conveniently washed to keep the same in a sanitary condition.

A still further object of the invention is the provision of a cooking utensil for frying or broiling food products including a handle which may be easily removed to permit use of the utensil in an oven or broiler without damage to the handle.

Further objects and advantages of the invention will be apparent from the following description taken in conjunction with the accompanying drawing wherein.

Figure 3:
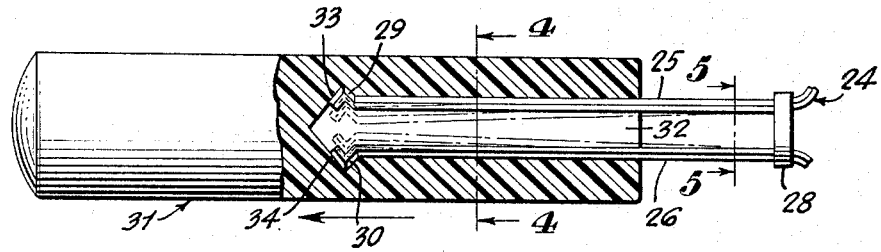
Figure 4:
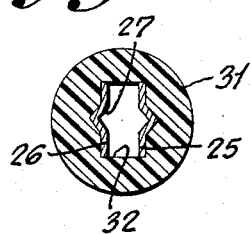

FIG. 3 a fragmentary top plan view with parts broken away and in section for greater clarity and showing the manner in which the handle is releasably retained on the cooking utensil of this invention;

FIG. 4 a sectional view taken substantially on the line 4—4 of FIG. 3; and

Figure 5:
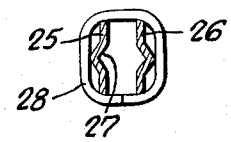

FIG. 5 a sectional view taken substantially on the line 5—5 of FIG. 3.

With continued reference to the drawing, there is shown a cooking utensil for frying food products constructed in accordance with this invention and which may well comprise a circular, one-piece body portion 10 having a central circular, flat cooking surface 11 which is surrounded by a circular depressed portion 12 providing a circular drip trough 13. The outer wall 14 of the drip trough 13 extends upwardly and terminates in a return bend 15 disposed above the plane of the cooking surface 11 and from the return bend 15, an outer circular body wall 16 extends vertically downwardly and terminates in a peripheral flange 17.

Figure 2:
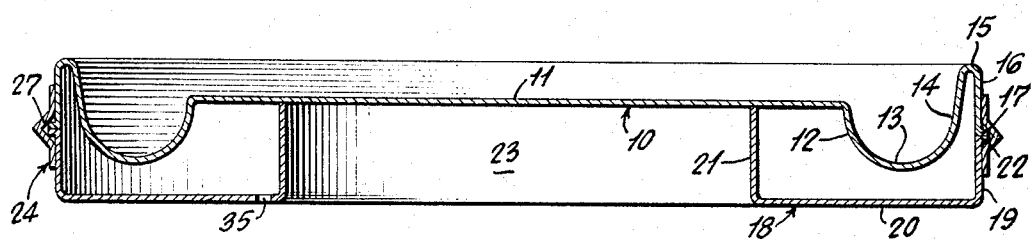
FIG. 2 is a sectional view taken substantially on the line 2—2 of FIG. 1.

A circular one-piece ring-shaped support portion 18 is provided with an outer vertical wall 19, a horizontal bottom wall 20 and a vertical inner wall 21. The outer wall 19 terminates at the upper end in a peripheral flange 22 which abuts the flange 17, as clearly shown in FIG. 2. The bottom wall 20 of the support portion 18 is disposed below the drip trough 13 in spaced relation thereto and the vertical inner wall 21 extends upwardly from the bottom wall 20 into contact with the lower side of the cooking surface 11 and since the diameter of the inner wall 21 is only slightly less than the diameter of the cooking surface 11, there is provided a relatively large downwardly opening circular recess 23 which permits the radiation of heat from a suitable source directly to a major portion of the cooking surface 11. The space within the support portion 18 serves to partially insulate the drip trough 13 from heat radiated from the stove or other heat source on which the utensil of this invention is placed and in this way prevents overheating of drippings present in the drip trough 13.

Figure 1:
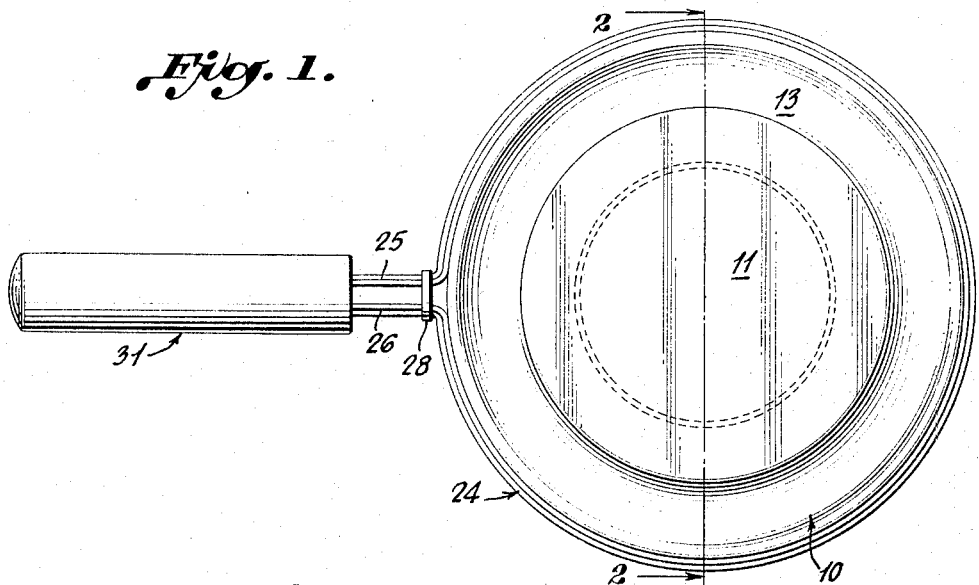
FIG. 1 is a top plan view showing a cooking utensil constructed in accordance with this invention.

The body portion 10 and the support portion 18 are securely held in assembled relationship by a band 24 surrounding the body portion and the support portion and as clearly shown in FIGS. 1 and 3, the band 24 terminates in outwardly extending spaced, substantially parallel arms 25 and 26. The band 24 is formed to provide an inwardly opening, generally V-shaped groove 27 and the walls of the groove engage the edges of the peripheral flanges 17 and 22 and provide camming surfaces to urge such flanges tightly together when band 24 is clamped around the body portion 10 and support portion 18. The band 24 is held in clamping position by means of a suitable clip 28 clearly shown in FIGS. 1, 3 and 5, and the clip is applied to the arms 25 and 26 closely adjacent the band 24 and in such a manner, as to hold the band in tight engagement with the outer surfaces of the outer wall 16 of the body portion 10 and the outer wall 19 of the support portion 18 and, at the same time, by reason of the camming surfaces provided by the groove 27 to hold the flanges 17 and 22 in tight engagement, thereby retaining the body portion 10 and support portion 18 in assembled relationship. While a clip 28 is illustrated and described for holding the band 24 in clamping position, obviously other means, such as a rivet or screw threaded fastening means may be employed for this purpose and the clip is shown by way of illustration and is not to be considered as limiting the invention to the use thereof.

The outer ends of the arms 25 and 26 terminate in opposed outwardly extending projections 29 and 30 and as clearly shown in FIGS. 3 and 4, a suitable elongated handle 31 may be provided with an elongated longitudinal opening 32 therein and as clearly shown in FIG. 4, the opening 32 is formed in such a manner as to receive and closely engage the arms 25 and 26 of the band 24. As shown in FIG. 3, the longitudinal opening 32 in the handle 31 terminates at the inner end in opposed inwardly opening recesses 33 and 34 which are complementary to the projections 29 and 30 on the arms 25 and 26 and when it is desired to assemble the handle 3 with the arms 25 and 26, it is only necessary to squeeze such arms together as shown in dotted lines in FIG. 3, at which time the arms may be inserted within the opening 32 until the projections 29 and 30 engage in the recesses 33 and 34 which will operate to retain the handle 31 on the arms 25 and 26. The handle 31 may be conveniently removed by again squeezing the arms 25 and 26 together to release the projections 29 and 30 from the recesses 33 and 34, at which time the handle 31 may be withdrawn. While the arms 25 and 26 are shown substantially parallel when inserted in the handle 31 it is to be understood that upon removal of the handle 31, the arms 25 and 26 will diverge so as to provide sufficient resiliency for holding the handle in place.

It is to be noted that the inner circular wall 21 of the support portion 18 merely contacts the lower side of the cooking surface 11 and is not secured thereto, and, therefore, during washing of the utensil there is a possibility that water may enter the space within the support portion 18 and in order to permit convenient drainage of such water therefrom, one or more suitable drain openings 35 may be provided in the bottom wall 20 of the support portion 18.

While for purposes of economy in manufacture, the inner wall 21 of the support portion 18 is not secured to the cooking surface 11, nevertheless, if desired, the wall may be secured thereto, but this is not necessary to a proper operation of the utensil or for retaining the body portion 10 and support portion 18 in assembled relationship since the band 24 serves to adequately accomplish this purpose.

While normally the diameter of the recess 23 will be substantially equal to the diameter of the heat source, such as the burner of a stove, nevertheless, a utensil of this invention will still operate as intended if the burner overlaps the portion of the bottom wall 20 of the support portion 18, since the space within the portion 18 provides adequate insulation for the drip trough 13 and serves to maintain the temperature thereof sufficiently low to prevent the emission of undesirable smoke or vapors from any drippings collected therein. Obviously, the parts of the utensil of this invention may be conveniently and economically manufactured from suitable lightweight materials, such as aluminum or the like, and may be conveniently and economically formed by conventional metalworking operations, such as stamping, drawing or spinning and assembly of the parts may be accomplished by relatively unskilled labor thereby materially contributing to the low cost of this utensil.

It will be obvious to those skilled in the art that various changes may be made in the invention without departing from the spirit and scope thereof and therefore the invention is not limited by that which is shown in the drawing and described in the specification, but only as indicated in the appended claims.

What is claimed is:

1. A cooking utensil for frying food products, said utensil comprising a circular one-piece body portion having a central circular flat cooking surface, said body portion being formed to provide a circular drip trough surrounding said cooking surface, the outer wall of said trough terminating in a return bend disposed above the plane of said cooking surface, an outer body wall extending downwardly from said return bend and terminating in a peripheral flange, a circular one-piece ring-shaped support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall into contact with the lower side of said cooking surface to provide a downwardly opening circular recess below the major portion of said cooking surface, the space within said support portion serving to partially insulate said trough and prevent overheating of drippings therein, a band surrounding said body portion and said support portion and terminating in outwardly extending spaced, substantially parallel arms, said band having an inwardly opening generally V-shaped groove with the walls of said groove providing camming surfaces engaging said flanges to urge the same together, a clip surrounding said arms to hold said band in tight engagement with said body portion and said support portion, opposed outwardly extending projections on the ends of said arms and an elongated handle having an elongated longitudinal opening therein, said opening terminating at the inner end in opposed inwardly opening recesses, said arms extending into said opening with said projections received in said last named recesses to removably retain said handle on said utensil.

2. A cooking utensil for frying food products, said utensil comprising a circular one-piece body portion having a central circular flat cooking surface, said body portion being formed to provide a circular drip trough surrounding said cooking surface, the outer wall of said trough terminating in a return bend disposed above the plane of said cooking surface, an outer body wall extending downwardly from said return bend and terminating in a peripheral flange, a circular one-piece ring-shaped support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall into contact with the lower side of said cooking surface to provide a downwardly opening circular recess below the major portion of said cooking surface, the space within said support portion serving to partially insulate said trough and prevent overheating of drippings therein, a band surrounding said body portion and said support portion and terminating in outwardly extending spaced substantially parallel arms, said band having an inwardly opening generally V-shaped groove with the walls of said groove providing camming surfaces engaging said flanges to urge the same together, a clip surrounding said arm to hold said band in tight engagement with said body portion and said support portion, an elongated handle and means to removably retain said handle on said arms.

3. A cooking utensil for frying food products, said utensil comprising a circular one-piece body portion having a central circular flat cooking surface, said body portion being formed to provide a circular drip trough surrounding said cooking surface, the outer wall of said trough terminating in a return bend disposed above the plane of said cooking surface, an outer body wall extending downwardly from said return bend and terminating in a peripheral flange, a circular one-piece ring-shaped support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall into contact with the lower side of said cooking surface to provide a downwardly opening circular recess below the major portion of said cooking surface, the space within said support portion serving to partially insulate said trough and prevent overheating of drippings therein, a band surrounding said body portion and said support portion, said band having an inwardly opening generally V-shaped groove with the walls of said groove providing camming surfaces engaging said flanges to urge the same together, means to hold said band in tight engagement with said body portion and said support portion, an elongated handle and means to removably retain said handle on said utensil.

4. A cooking utensil for frying food products, said utensil comprising a circular one-piece body portion having a central circular flat cooking surface, said body portion being formed to provide a circular drip trough surrounding said cooking surface, the outer wall of said trough terminating in return bend, an outer body wall extending downwardly from said return bend and terminating in a peripheral flange, a circular one-piece ring-shaped support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall into contact with the lower side of said cooking surface to provide a downwardly opening circular recess below the major portion of said cooking surface, the space within said support portion serving to partially insulate said trough and prevent overheating of drippings therein, a band surrounding said body portion and said support portion, said band having an inwardly opening generally V-shaped groove with the walls of said groove providing camming surfaces engaging said flanges to urge the same together, means to hold said band in tight engagement with said body portion and said support portion, an elongated handle and means to removably retain said handle on said utensil.

5. A cooking utensil for frying food products, said utensil comprising a circular one-piece body portion having a central circular flat cooking surface, said body portion being formed to provide a circular drip trough surrounding said cooking surface, the outer wall of said trough terminating in a return bend, an outer body wall extending downwardly from said return bend and terminating in a peripheral flange, a circular one-piece ring-shaped support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall to provide a downwardly open circular recess below the major portion of said cooking surface, the space within said support portion serving to partially insulate said trough and prevent overheating of drippings therein, a band surrounding said body portion and said support portion, said band having an inwardly opening generally V-shaped groove with the walls of said grooves providing camming surfaces engaging said flanges to urge the same together, means to hold said band in tight engagement with said body portion and said support portion, an elongated handle and means to secure said handle on said utensil.

6. A cooking utensil for frying food products, said utensil comprising a circular one-piece body portion having a central circular flat cooking surface, said body portion being formed to provide a circular drip trough surrounding said cooking surface, the outer wall of said trough terminating in a return bend, an outer body wall extending downwardly from said return bend and terminating in a peripheral flange, a circular one-piece ring-shaped support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall to provide a downwardly opening circular recess below the major portion of said cooking surface, the space within said support portion serving to partially insulate said trough and prevent overheating of drippings therein, means to secure said support portion to said body portion, a handle and means to secure said handle on said utensil.

7. A cooking utensil for frying food products, said utensil comprising a circular one-piece body portion having a central circular flat cooking surface, said body portion being formed to provide a circular drip trough surrounding said cooking surface, the outer wall of said trough terminating in a return bend, an outer body wall extending downwardly from said return bend, a circular one-piece ring-shaped support portion having an outer vertical wall, a horizontal bottom wall and a vertical inner wall, said last named outer wall abutting said outer body wall, said bottom wall being disposed below said trough in spaced relation thereto, said vertical inner wall extending upwardly from said bottom wall to provide a downwardly opening circular recess below the major portion of said cooking surface, the space within said support portion serving to partially insulate said trough and prevent overheating of drippings therein, means to secure said support portion to said body portion, a handle and means to secure said handle on said utensil.

8. A cooking utensil for frying food products, said utensil comprising a one-piece body portion having a central flat cooking surface, said body portion being formed to provide a drip trough surrounding said cooking surface, the outer wall of said trough terminating in a return bend, an outer body wall extending downwardly from said return bend, a one-piece support portion having an outer vertical wall, a horizontal bottom wall and a vertical inner wall, said last named outer wall abutting said outer body wall, said bottom wall being disposed below said trough in spaced relation thereto, said vertical inner wall extending upwardly from said bottom wall to provide a downwardly opening circular recess below the major portion of said cooking surface, the space within said support portion serving to partially insulate said trough and prevent overheating of drippings therein, means to secure said support portion to said body portion, a handle and means to secure said handle on said utensil.

9. A cooking utensil for fatty food products to be fried or broiled, said utensil comprising a one-piece body portion having a flat cooking surface, said body portion being formed to provide a drip trough surrounding said cooking surface, the outer wall of said trough terminating in a return bend, an outer body wall extending downwardly from said return bend and terminating in a peripheral flange, a one-piece support portion having an outer vertical wall, a horizontal bottom wall and a vertical inner wall, said last named outer wall having a peripheral flange abutting said first mentioned flange, said bottom wall being disposed below said trough in spaced relation thereto, said vertical inner wall extending upwardly from said bottom wall in contact with the lower side of said cooking surface, a band surrounding said body portion and said support portion and terminating in outwardly extending diverging arms, said band having an inwardly tapered groove providing camming surfaces engaging said flanges to urge the same together, a clip surrounding said arms to hold said band in tight engagement with said body portion and said support portion, opposed outwardly extending projections on the ends of said arms and an elongated handle having an elongated longitudinal opening therein, said opening terminating at the inner end in opposed inwardly opening recesses, said arms extending into said opening with said projections received in said last named recesses to removably retain said handle on said utensil.

References Cited by the Examiner

UNITED STATES PATENTS

| | | | |
|---|---|---|---|
| 2,008,767 | 7/1935 | Munn | 99—425 |
| 2,534,407 | 12/1950 | Bramberry | 99—425 |
| 2,779,266 | 1/1957 | Trapani | 99—425 |
| 3,079,855 | 3/1963 | Valis | 99—425 |
| 3,130,664 | 4/1964 | Jarmuth et al. | 99—425 |

FOREIGN PATENTS 624,264    4/1927    France.

WALTER A. SCHEEL, *Primary Examiner.*

R. W. JENKINS, *Examiner.*